(12) United States Patent
Bischel et al.

(10) Patent No.: US 6,948,327 B2
(45) Date of Patent: Sep. 27, 2005

(54) HOT GAS HEAT TREATMENT SYSTEM

(75) Inventors: Kevin Bischel, Rockton, IL (US);
Kenneth Moshier, Roscoe, IL (US);
Martin Singletary, Beloit, WI (US);
Timothy Whitney, Beloit, WI (US)

(73) Assignee: Carrier Commercial Refrigeration, Inc., Charlotte, NC (US)

( * ) Notice: Subject to any disclaimer, the term of this patent is extended or adjusted under 35 U.S.C. 154(b) by 58 days.

(21) Appl. No.: 10/847,797

(22) Filed: May 18, 2004

(65) Prior Publication Data

US 2004/0211201 A1 Oct. 28, 2004

Related U.S. Application Data

(63) Continuation-in-part of application No. 10/278,418, filed on Oct. 23, 2002, now Pat. No. 6,735,967.

(51) Int. Cl.[7] .............................................. F25B 41/00
(52) U.S. Cl. ..................................... 62/196.4; 62/238.6
(58) Field of Search ........................... 62/196.4, 238.6, 62/331, 342

(56) References Cited

U.S. PATENT DOCUMENTS

| | | | | |
|---|---|---|---|---|
| 4,476,146 A | | 10/1984 | Manfroni | |
| 4,704,877 A | * | 11/1987 | Selcukoglu | 62/532 |
| 4,803,847 A | * | 2/1989 | Koeneman et al. | 62/68 |
| 6,360,547 B1 | * | 3/2002 | Reznik | 62/87 |
| 6,490,872 B1 | * | 12/2002 | Beck et al. | 62/66 |
| 6,494,055 B1 | * | 12/2002 | Meserole et al. | 62/342 |
| 6,553,779 B1 | * | 4/2003 | Boyer et al. | 62/342 |
| 2004/0079095 A1 | * | 4/2004 | Bischel et al. | 62/196.4 |

* cited by examiner

Primary Examiner—Melvin Jones
(74) Attorney, Agent, or Firm—Carlson, Gaskey & Olds

(57) ABSTRACT

A refrigeration system both cools and heats frozen dessert mix in at least two hoppers and at least two freezing cylinders. A liquid line solenoid valve at the inlet of each of the hoppers and the freezing cylinders controls the flow of refrigerant from the condenser. A hot gas solenoid valve at the inlet of each of the hoppers and the freezing cylinders controls the flow of hot refrigerant from the compressor. The system further includes a hot gas bypass valve that is opened when only the hoppers are being cooled to provide additional compressor load. An EPR valve proximate to the hopper discharges varies the temperature of the refrigerant exchanging heat with the mix in the hoppers. A CPR valve controls the inlet pressure of the compressor by reducing the amount of hot refrigerant flowing into the compressor suction. A TREV valve injects liquid refrigerant to the compressor suction to control excessive compressor discharge during the cool cycle.

18 Claims, 3 Drawing Sheets

HOT GAS HEAT TREATMENT SYSTEM

REFERENCE TO RELATED APPLICATIONS

This application is a continuation-in-part to patent application Ser. No. 10/278,418, filed Oct. 23, 2002, now U.S. Pat. No. 6,735,967 issued on May 18, 2004.

TECHNICAL FIELD

The present invention relates generally a hot gas heat treatment system used in a frozen dessert system to cool frozen dessert mix for serving and to heat the frozen dessert mix during heat treatment. More specifically, the present invention relates to a frozen dessert system including more than one hopper and more than one freezing cylinder.

BACKGROUND OF THE INVENTION

A refrigeration system is employed to cool a mix in a frozen dessert system. The frozen dessert system typically includes a hopper which stores the mix and a freezing cylinder that cools and adds air into the mix prior to serving. The freezing cylinder is cooled by a refrigeration system. Refrigerant is compressed in a compressor to a high pressure and a high enthalpy. The refrigerant flows through a condenser and rejects heat to a fluid medium and is cooled. The high pressure and low enthalpy refrigerant is then expanded to a low pressure. The refrigerant flows through tubing encircling the freezing cylinder and cools the mix in the freezing cylinder. The low pressure and high enthalpy refrigerant returns to the compressor, completing the cycle.

The hopper is cooled by a separate glycol system including tubes that wrap around both the hopper and the freezing cylinder. The glycol first flows around the freezing cylinder and is cooled. The cooled glycol then flows around the hopper to cool the mix in the hopper. To meet food safety standards, the mix in the hopper is generally maintained below 41° F.

The mix is heat treated every night to kill any bacteria. The mix is heated for approximately 90 minutes to a temperature of at least 150° F. The mix is maintained at a temperature over 150° F. for 30 minutes and then cooled to 41° F. within 120 minutes. The mix is heated by heating the glycol with an electrical resistance heater or a gas burner. The heated glycol flows around the hopper and the freezing cylinder to heat the mix.

A drawback to this system is that the freezing cylinder and the hopper are coupled by the glycol system. When the cooled glycol flows around the hopper during cooling, the glycol is heated. The heated glycol then flows around the freezing cylinder, which can melt the mix in the freezing cylinder.

During heat treatment, the glycol first heats the mix in the freezing cylinder. The glycol is cooled and therefore less effective in heating the mix in the hopper. It takes longer to heat the mix in the hopper, possibly increasing the length of the heat treatment cycle to over three hours. The heat treatment cycle can change the flavor of the mix, and a longer heat treatment cycle can negatively affect the flavor of the frozen dessert.

In prior hot gas heat treatment systems, the mix in the hopper and the freezing cylinder cannot be separately cooled. If one of the hopper and the freezing cylinder required cooling, the other has to be cooled as well. The suction lines of the hopper and the freezing cylinder of the prior art system are coupled, and therefore it is difficult to vary the pressure, and hence the temperature, of the refrigerant flowing around the hopper and the freezing cylinder. It is preferably for the refrigerant cooling the mix in the hopper to have a different temperature and pressure than the refrigerant freezing the mix in the freezing cylinder. Another drawback of the prior art hot gas heat treatment system is that the system has a low capacity, and therefore the compressor is undersized to attain compressor reliability.

SUMMARY OF THE INVENTION

The hot gas heat treat system of the present invention includes a first hopper and a second hopper which each store a mix for forming a frozen product. The mix from the first hopper and the second hopper flow into a first freezing cylinder and a second freezing cylinder, respectively, for cooling and mixing with air to form a frozen dessert. The mix in the first hopper and the first freezing cylinder can have a first flavor, and the mix in the second hopper and the second freezing cylinder can have a second flavor.

Refrigerant is compressed in a compressor and then cooled by a condenser. The liquid refrigerant is then split into four paths, and one path flows to each of the hoppers and freezing cylinders. The refrigerant flowing to the freezing cylinders is expanded to a low pressure by an AXV expansion valve and cools the mix in the freezing cylinders. The refrigerant flowing to the hoppers is expanded to a low pressure by a TXV expansion valve and cools the mix in the hoppers. After cooling the mix in the freezing cylinders and the hoppers, the refrigerant is at a low pressure and high enthalpy. The refrigerant paths merge, and the refrigerant returns to the compressor for compression.

A liquid line solenoid valve is positioned before each of the expansion valves proximate to the inlets of the hoppers and the freezing cylinder to control the flow of cool high pressure liquid refrigerant from the condenser. A hot gas solenoid valve is also positioned at each of the inlets of the hoppers and the freezing cylinders to control flow of hot gaseous refrigerant from the compressor. When the system is operating in a cooling mode, the liquid line solenoid valves are opened and the hot gas solenoid valves are closed to allow the flow of cool liquid refrigerant from the condenser into the hoppers and the freezing cylinders to cool the mix. When the system is operating in a heating mode for nightly heat treatment, the hot gas solenoid valves are opened and the liquid line solenoid valves are closed to allow the flow of hot refrigerant from the compressor into the hoppers and the freezing cylinders to heat the mix.

The system further includes a hot gas bypass valve to allow refrigerant gas from the compressor discharge to flow to the compressor suction to increase compressor load. An EPR valve is positioned proximate to each of the hopper discharges to maintain the evaporator pressure, and therefore the temperature, of the refrigerant flowing through the hoppers. The system includes a CPR valve to limit the inlet pressure of the compressor by reducing the amount of refrigerant flowing into the compressor suction. The system also includes a TREV valve that allows the high pressure liquid refrigerant from the condenser to flow into the compressor suction to cool both the compressor suction and discharge.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
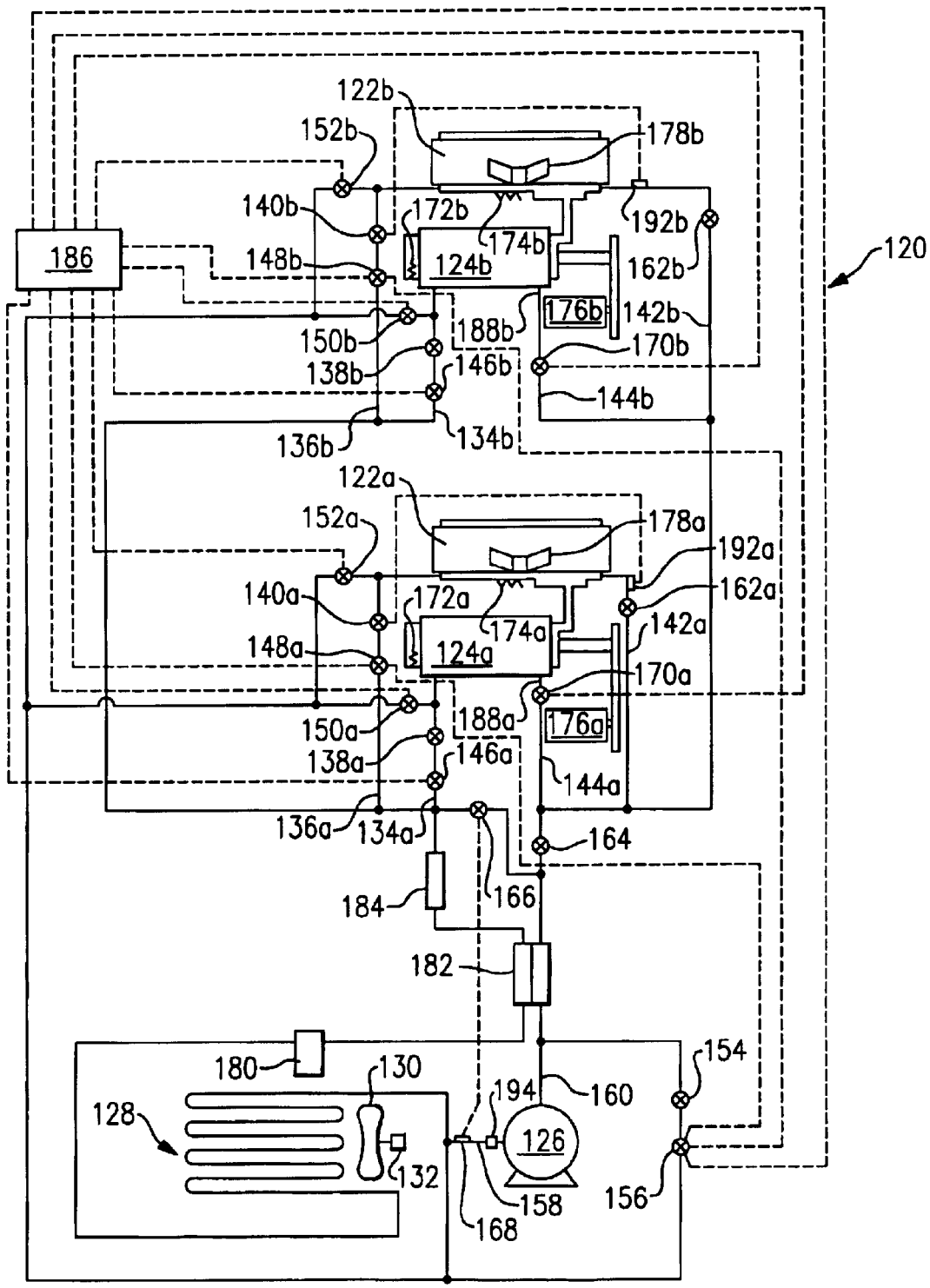
FIG. 1 schematically illustrates a first embodiment of the hot gas heat treatment system of the present invention.

FIG. 1 schematically illustrates the hot gas heat treatment system 120 of the present invention. The system 120 includes a first hopper 122a and a second hopper 122b which each store a mix for making a frozen dessert product, such as soft service ice cream or a milkshake. The mix in the first hopper 122a and the mix in the second hopper 122b can be different flavors. That is, the mix in the first hopper 122a and the first freezing cylinder 124a can have one flavor, and the mix in the second hopper 122b and the second freezing cylinder 124b can have a different flavor.

In one example, the hoppers 122a and 122b are each 20 quart hoppers. The mix in the first hopper 122a flows into a first freezing cylinder 124a, and the mix in the second hopper 122a flows into a second freezing cylinder 124b. In the freezing cylinders 124a and 124b, the mix is frozen and mixed with air to form the frozen dessert product.

In a gravity fed system, a standard air-mix feed tube is used to meter the air into the freezing cylinders 124a and 124b. In a pump system, air is metered into the freezing cylinders 124a and 124b by a pump. Preferably, the freezing cylinders 124a and 124b are each made of stainless steel. The frozen product is then dispensed from the freezing cylinders 124a and 124b for serving. The frozen product in the freezing cylinders 124a and 124b can also be twisted together to form a frozen dessert with two flavors.

The hoppers 122a and 122b and the freezing cylinders 124a and 124b are cooled by a refrigeration system. Refrigerant flows through the closed circuit system. In one example, the refrigerant is R404A. The hot gas refrigerant is compressed in a compressor 126 to a high pressure and a high enthalpy. The compressor 126 can be a single speed, a two speed, or other variable speed compressor. The compressor 126 can also have variable displacement or capacity. The refrigerant then flows through a condenser 128 and rejects heat to a fluid medium. The refrigerant is cooled by a fan 130 driven by a motor 132. In one example, the condenser 128 is a three row 5/16 inch tube and raised lanced fin condenser. The condenser 128 can be either a water cooled condenser or an air cooled condenser. However, it is to be understood that other types of condensers 128 can be employed. Due to the high refrigeration loads during the heating mode, the capacity of the condenser 128 must be increased versus similar capacity non-heat treat configurations. The size of the compressor 126 and the size of the condenser 128 are balanced and related to each other.

The refrigerant cooled by the condenser 128 is split into four paths 134a, 134b, 136a and 136b. The path 134a leads to the first freezing cylinder 124a, the path 134b leads to the second freezing cylinder 124b, the path 136a leads to the first hopper 122a, and the path 136b leads to the second hopper 122b.

The refrigerant flowing along the path 134a passes through an expansion valve 138a and is expanded to a low pressure. Preferably, the expansion valve 138a is an AXV expansion valve. An AXV expansion valve is an automatic expansion valve that constantly regulates pressure to control the evaporating pressure of the refrigerant flowing around the first freezing cylinder 124a at 20–22 psig, which corresponds to approximately −15° F. Because the mix in the first freezing cylinder 124a is sensitive to the fixed evaporator temperature, this allows for consistent product quality. The mix in the first freezing cylinder 124a usually takes less time to cool than the mix in the first hopper 122a. Although an AXV expansion valve has been described, it is to be understood that other types of expansion valve can be employed.

After expansion, the refrigerant flows through tubing encircling the first freezing cylinder 124a, accepting heat from and cooling the mix in the first freezing cylinder 124a. The refrigerant exits the tubing around the first freezing cylinder 124a through a path 144a. Although tubing has been described, it is to be understood that the refrigerant can also flow through a chamber that is proximate to the first freezing cylinder 124a.

The refrigerant flowing along the path 136a passes through an expansion valve 140a and is expanded to a low pressure. Preferably, the expansion valve 140a is a TXV expansion valve. A TXV expansion valve, or thermal expansion valve, has a higher capacity for heat removal. The refrigeration capacity required to cool the first hopper 122a varies and is proportional to the mix level in the first hopper 122a. The TXV expansion valve 140a provides control of the refrigerant massflow to the first hopper 122a and maintains the set amount of superheat to assure compressor 126 reliability. The TXV expansion valve 140a attempts to maintain a superheat of 10° F.

The TXV expansion valve 140a is controlled by a temperature sensing bulb 192a. The temperature sensing bulb 192a senses the temperature of the refrigerant exiting the first hopper 122a. Based on the value detected by the temperature sensing bulb 192a, the TXV expansion valve 140a controls the pressure, and therefore the temperature, of the refrigerant entering the first hopper 122a by controlling the amount of refrigerant that enters the first hopper 122a. In this example, the TXV expansion valve 140a is a pressuring limiting TXV expansion valve that regulates the suction pressure of the first hopper 122a to regulate the superheat out of the first hopper 122a.

After expansion, the refrigerant flows through tubing encircling the first hopper 122a, accepting heat from and cooling the mix in the first hopper 122a. In one example, the tubing encircling the first hopper 122a is a copper tube refrigeration line wrapped around and soldered to the bottom and the walls of the first hopper 122a and have a diameter of approximately 5/16 of an inch in diameter. However, it is to be understood that the tubing can have other diameters or be made of other materials. Preferably, the surface area of the refrigeration line soldered to the bottom of the first hopper 122a is maximized. Preferably, the refrigerant that cools the mix in the first hopper 122a is between 22° and 24° F., keeping the mix in the first hopper 122a between 37° and 39° F., below the standard of 41° F. The refrigerant exits the first hopper 122a through a path 142a.

The refrigerant flowing along the path 134b passes through an expansion valve 138b and is expanded to a low pressure. Preferably, the expansion valve 138b is an AXV expansion valve. An AXV expansion valve is an automatic expansion valve that constantly regulates pressure to control the evaporating pressure of the refrigerant flowing around the second freezing cylinder 124b at 20–22 psig, which corresponds to approximately −15° F. Because the mix in the second freezing cylinder 124b is sensitive to the fixed evaporator temperature, this allows for consistent product quality. The mix in the second freezing cylinder 124b usually takes less time to cool than the mix in the hopper 122b. Although an AXV expansion valve has been described, it is to be understood that other types of expansion valve can be employed.

After expansion, the refrigerant flows through tubing encircling the second freezing cylinder 124b, accepting heat from and cooling the mix in the second freezing cylinder 124b. The refrigerant exits the tubing around the second freezing cylinder 124b through a path 144b. Although tubing has been described, it is to be understood that the refrigerant can also flow through a chamber that is proximate to the second freezing cylinder 124b.

The refrigerant flowing along the path 136b passes through an expansion valve 140b and is expanded to a low pressure. Preferably, the expansion valve 140b is a TXV expansion valve. A TXV expansion valve, or thermal expansion valve, has a higher capacity for heat removal. The refrigeration capacity required to cool the second hopper 122b varies and is proportional to the mix level in the second hopper 122b. The TXV expansion valve 140b provides control of the refrigerant massflow to the second hopper 122b and maintains the set amount of superheat to assure compressor 126 reliability. The TXV expansion valve 140b attempts to maintain a superheat of 10° F.

The TXV expansion valve 140b is controlled by a temperature sensing bulb 192b. The temperature sensing bulb 192b senses the temperature of the refrigerant exiting the second hopper 122b. Based on the value detected by the temperature sensing bulb 192b, the TXV expansion valve 140b controls the pressure, and therefore the temperature, of the refrigerant entering the second hopper 122b by controlling the amount of refrigerant that enters the second hopper 122b. In this example, the TXV expansion valve 140b is a pressuring limiting TXV expansion valve that regulates the suction pressure of the second hopper 122b to regulate the superheat out of the second hopper 122b.

After expansion, the refrigerant flows through tubing encircling the second hopper 122b, accepting heat from and cooling the mix in the second hopper 122b. In one example, the tubing encircling the second hopper 122b is a copper tube refrigeration line wrapped around and soldered to the bottom and the walls of the second hopper 122b and have a diameter of approximately ⁵⁄₁₆ of an inch in diameter. However, it is to be understood that the tubing can have other diameters or be made of other materials. Preferably, the surface area of the refrigeration line soldered to the bottom of the second hopper 122b is maximized. Preferably, the refrigerant that cools the mix in the second hopper 122b is between 22° and 24° F., keeping the mix in the second hopper 122b between 37° and 39° F., below the standard of 41° F. The refrigerant exits the second hopper 122b through a path 142b.

After cooling the mix in the freezing cylinders 124a and 124b and the hoppers 122a and 122b, the refrigerant is at a low pressure and a high enthalpy. The refrigerant paths 142a, 142b, 144a and 144b merge and the refrigerant returns to the compressor 126 for compression, completing the cycle.

The system 120 further includes a receiver 180 that stores excess refrigerant and controls the variable amount of free refrigerant in the system 120. A heat exchanger/sub-cooler 182 is employed to exchange heat between the gaseous refrigerant exiting the hoppers 122a and 122b and the freezing cylinders 124a and 124b and the liquid refrigerant flowing towards the expansion valves 138a, 138b, 140a and 140b to further increase capacity. The heat exchanger/sub-cooler 182 warms the suction gas entering the compressor 126, ensuring that only gaseous refrigerant, and not liquid refrigerant, enters the compressor 126 and increasing compressor 126 life. A filter/dryer 184 is employed to trap any debris in the refrigerant and to remove any water which may have leaked into the refrigeration system 120.

The system 120 operates in a heating mode to heat treat the mix in the hoppers 122a and 122b and the freezing cylinders 124a and 124b. The system 120 further includes hot gas solenoid valves 150a, 150b, 152a and 152b that control the flow of refrigerant from the compressor discharge 158 to the freezing cylinders 124a and 124b and the hoppers 122a and 122b, respectively. When the mix is heated, the hot gas solenoid valves 150a, 150b, 152a and 152b are opened to allow hot gas refrigerant from the compressor discharge 158 of the compressor 126 to bypass the condenser 128 and flow around the hoppers 122a and 122b and the freezing cylinders 124a and 124b. The liquid line solenoid valves 146a, 146b, 148a and 148b are closed to prevent the cooled refrigerant from the condenser 128 from flowing to around the hoppers 122a and 122b and the freezing cylinders 124a and 124b.

The mix is heated to at least 150° F. for at least 30 minutes every night to heat treat the mix and kill any bacteria. The refrigeration line is soldered to both the bottom and the walls of the hoppers 122a and 122b, increasing the surface area and reducing baking of the mix on the walls of the hoppers 122a and 122b. The mix bakes when a mix film clings to the walls of the hoppers 122a and 122b as the mix level drops. The hoppers 122a and 122b and the freezing cylinders 124a and 124b are heated separately, and therefore the mix can be both cooled and heated faster, reducing the time of the heat treatment cycle.

During the heating mode, it is preferable to first open the hot gas solenoid valves 152a and 152b to heat the hoppers 122a and 122b alone for a few minutes prior to opening the hot gas solenoid valves 150a and 150b and heating the freezing cylinders 124a and 124b to prevent compressor 126 flood back. The hot gas solenoid valves 150a, 150b, 152a and 152b are controlled separately and can be de-energized asynchronously. Temperatures sensors 172a, 172b, 174a and 174b provide temperature feedback from the freezing cylinders 124a and 124b and the hoppers 122a and 122b, respectively, to indicate when the mix has reached the desired temperature. The temperatures of the mix in the hoppers 122a and 122b and the freezing cylinders 124a and 124b are provided to a control 186 which controls the system 120.

The liquid line solenoid valves 146a, 146b, 148a and 148b and the hot gas solenoid valves 150a, 150b, 152a and 152b are controlled separately by the control 186. The hoppers 122a and 122b and the freezing cylinders 124a and 124b can therefore be cooled and heated separately.

When only the hoppers 122a and 122b alone are to be cooled during the cooling mode, it is possible that not enough load is provided on the compressor 126, reducing the suction pressure of the compressor 126 and affecting compressor 126 reliability. When only the hoppers 122a and 122b are being cooled, the liquid line solenoid valves 146a and 146b are closed, and the liquid line solenoid valves 148a and 148b are opened. A hot gas bypass valve 154 may be opened to allow hot refrigerant from the compressor discharge 158 to flow into the compressor suction 160, applying extra load to the compressor 126. The hot gas bypass valve 154 is self-regulated. The refrigerant gas is diverted from performing any refrigerant effect, but provides a load to the compressor 126 to maintain the suction pressure of the compressor 126 above 10 psig.

The hot gas bypass valve 154 is closed at all other times. However, it is possible that the hot gas bypass valve 154 may not completely close, resulting in an undesirable leakage of refrigerant into the system 120. A hot gas bypass solenoid valve 156 can be employed in series with the hot gas bypass valve 154 to prevent undesirable leakage of refrigerant from the compressor discharge 158 into the system 120.

The hot gas bypass solenoid valve 156 is activated in parallel with the liquid line solenoid valves 148a and 148b so that the hot gas bypass solenoid valve 156 only opens when the liquid line solenoid valves 148a and 148b are opened. Alternately, the hot gas bypass solenoid valve 156 is activated by the control 186. When the control 186 determines that the liquid line solenoid valves 148a and 148b for the hoppers 122a and 122b are opened and the liquid line solenoid valves 146a and 146b for the freezing cylinders 124a and 124b are closed (indicating that the hoppers 122a and 122b alone are being cooled) the hot gas bypass solenoid valve 156 is also opened with the hot gas bypass valve 154 to provide additional load on the compressor 126. The hot gas bypass solenoid valve 156 is closed at all other times to prevent the leakage of refrigerant from the compressor discharge 158 into the system 120.

The system 120 further includes an evaporator pressure regulator valve, or an EPR valve 162a and 162b, positioned proximate to the discharge of each of the hoppers 122a and 122b, respectively. The EPR valves 162a and 162b are self-regulated. The refrigerant exchanging heat with the mix in the hoppers 122a and 122b and the freezing cylinders 124a and 124b is pumped from the same compressor 126. However, the refrigerant flowing around the hoppers 122a and 122b needs to be between 22° to 24° F. to cool the mix in the hoppers 122a and 122b to 37° to 39° F., and the refrigerant flowing around the freezing cylinders 124a and 124b needs to be about −15° F. to cool the mix in the freezing cylinders 124a and 124b to 20° F. The EPR valves 162a and 162b maintain the pressure of the refrigerant exchanging heat with the mix in the hoppers 122a and 122b at 60 psig, and therefore maintain the temperature of the refrigerant flowing around the hoppers 122a and 122b at the desired temperature.

A crankcase pressure regulator valve, or CPR valve 164, is employed to control the inlet pressure of the refrigerant entering the compressor 126 and to maintain the compressor suction pressure below 40 psig. The CPR valve 164 is also self-regulated. If the compressor suction pressure increases above 40 psig, the compressor 126 can stall. The CPR valve 164 is throttled or restricted to reduce the amount of hot refrigerant flowing into the compressor suction 160. The pressure of the refrigerant flowing into the compressor suction 160 decreases, and therefore the pressure of the refrigerant flowing through the compressor discharge 158 decreases. Alternately, the CPR valve 164 can be eliminated if the orifices in the hot gas solenoid valves 150a, 150b, 152a and 152b are sized to adequately limit refrigeration flow.

The system 120 further includes a liquid bypass valve or a temperature responsive expansion valve, or TREV valve 166, to adjust liquid refrigerant injection to the compressor suction 160 to control excessive compressor discharge temperature during the cooling mode. The TREV valve 166 is also self-regulating. A TREV bulb 168 positioned proximate to the compressor discharge 158 senses the temperature of the refrigerant at the compressor discharge 158. Alternately, the TREV bulb 168 is positioned proximate to the compressor suction 160 to monitor the suction temperature of the compressor 126. In one example, the TREV valve 166 and the TREV bulb 168 are connected by a capillary tube. When the TREV bulb 168 detects that the discharge temperature of the refrigerant approaches 230° F., the TREV valve 166 opens to allow the cool high pressure liquid refrigerant from the condenser 128 to flow into the compressor suction 160, cooling the compressor suction 160 and therefore the compressor discharge 158. Therefore, the compressor discharge 158 temperature can be kept below than 250° F.

The system 120 further includes a pressure switch 194 at the compressor discharge 158. When the pressure of the refrigerant exiting the compressor 126 is greater than 440 psig, the compressor 126 shuts off.

A suction solenoid valve 170a and 170b is located proximate to each of the discharge 188a of the first freezing cylinder 124a and the discharge 188b of the second freezing cylinder 124b, respectively. When only the hoppers 122 and 122b are being cooled, the suction solenoid valves 170a and 170b are closed to prevent refrigerant from migrating out of the freezing cylinders 124a and 124b.

During the heating mode, the hot gas solenoid valves 152a and 152b are first opened to heat the mix in the hoppers 122a and 122b first. The hot gas solenoid valves 150a and 150b are then opened to heat the mix in the freezing cylinders 124a and 124b. The hot gas solenoid valves 150a and 150b are opened after a set amount of time, for example after 10 minutes. The suction solenoid valves 170a and 170b are opened at the same time the hot gas solenoid valves 152a and 152b are opened to allow any refrigerant in the freezing cylinders 124a and 124b to boil off, preventing the refrigerant from flowing into and slugging the compressor 126. Alternately, the hot gas solenoid valves 150a, 150b, 152a and 152b and the suction solenoid valves 170a and 170b are opened at the same time.

The temperature sensors 172a, 172b, 174a and 174b detect the temperature of the mix in the freezing cylinders 124a and 124b and the hoppers 122a and 122b, respectively. When the system 120 is inactive and the temperature sensors 174a and 174b detect that the temperature of the mix in the hoppers 122a and 122b is greater than 39° F., the system 120 is activated and the cooling mode begins to cool the mix in the hoppers 122a and 122b to 37° F. The freezing cylinders 124a and 124b each further include a beater 176a and 176b, respectively. As the temperature of the mix proximate to the door of the freezing cylinders 124a and 124b is greatest, the beaters 176a and 176b are activated to stir the mix in the freezing cylinders 124a and 124b and equalize the product temperature. Agitators 178a and 178b also stir the mix in the respective hoppers 122a and 122b. The agitators 178a and 178b are an auto stepping motor assembly mounted to the bottom of the hoppers 122a and 122b and turn an agitator blade suspended in the mix.

If the system 120 is activated to cool the mix in the freezing cylinders 124a and 124b, the temperature of the mix in the hoppers 122a and 122b is monitored by the temperature sensors 174a and 174b prior to shutting the compressor 126 off. If the temperature of the mix in the hoppers 122a and 122b is detected to be greater than 37° F., the cool refrigerant is sent to the hoppers 122a and 122b for cooling the mix. Although the temperature of the mix in the hoppers 122a and 122b has not reached the threshold value of 39° (which triggers cooling), the mix in the hoppers 122a and 122b is cooled at this time because it is more efficient to cool the hoppers 122a and 122b while the system 120 is already operating in the cooling mode.

The liquid line solenoid valves 146a, 146b, 148a and 148b, the hot gas solenoid valves 150a, 150b, 152a and 152b, the suction solenoid valves 170a and 170b, and the hot gas bypass solenoid valve 156 are all controlled by the control 186, which is the main control 186 of the system 120. The hot gas bypass valve 154, the EPR valves 162a and 162b, the CPR valve 164, the TREV valve 166, and the expansion valves 138a, 138b, 140a and 140b are self-regulated. When the control 186 detects that it is necessary to cool the mix in one of the hoppers 122a and 122b and the freezing cylinders 124a and 124b, the control 186 activates the system 120 and opens the liquid line solenoid valves 146a, 146b, 148a and 148b. When the control 186 detects that it is necessary to heat the mix in one of the hoppers 122a and 122b and the freezing cylinders 124a and 124b, the control 186 activates the system 120 and opens the hot gas solenoid valves 150a, 150b, 152a and 152b and the suction solenoid valves 170a and 170b. The hoppers 122a and 122b and the freezing cylinders 124a and 124b can also be separately cooled and heated depending on system 120 requirements.

When the system 120 is operating in an automatic mode, the cooling mode is operated as needed when instructed by the control 186 to maintain the temperature of the mix in the hoppers 122a and 122b and the freezing cylinders 124a and 124b within the desired ranges. When frozen product is being drawn from the freezing cylinders 124a and 124b, a switch is activated and refrigerant is immediately sent to the freezing cylinders 124a and 124b. When no frozen product is being drawn from the freezing cylinders 124a and 124b, the system 120 may be placed in a standby mode. The system 120 enters the stand-by mode either manually or after a programmed or manual heat cycle. When the standby mode is activated, the product in the freezing cylinders 124a and 124b is allowed to melt. The mix in the freezing cylinders 124a and 124b is warmed to the temperature of the mix in the hoppers 122a and 122b, reducing the amount of churning, which can ruin the product quality.

Figure 2:
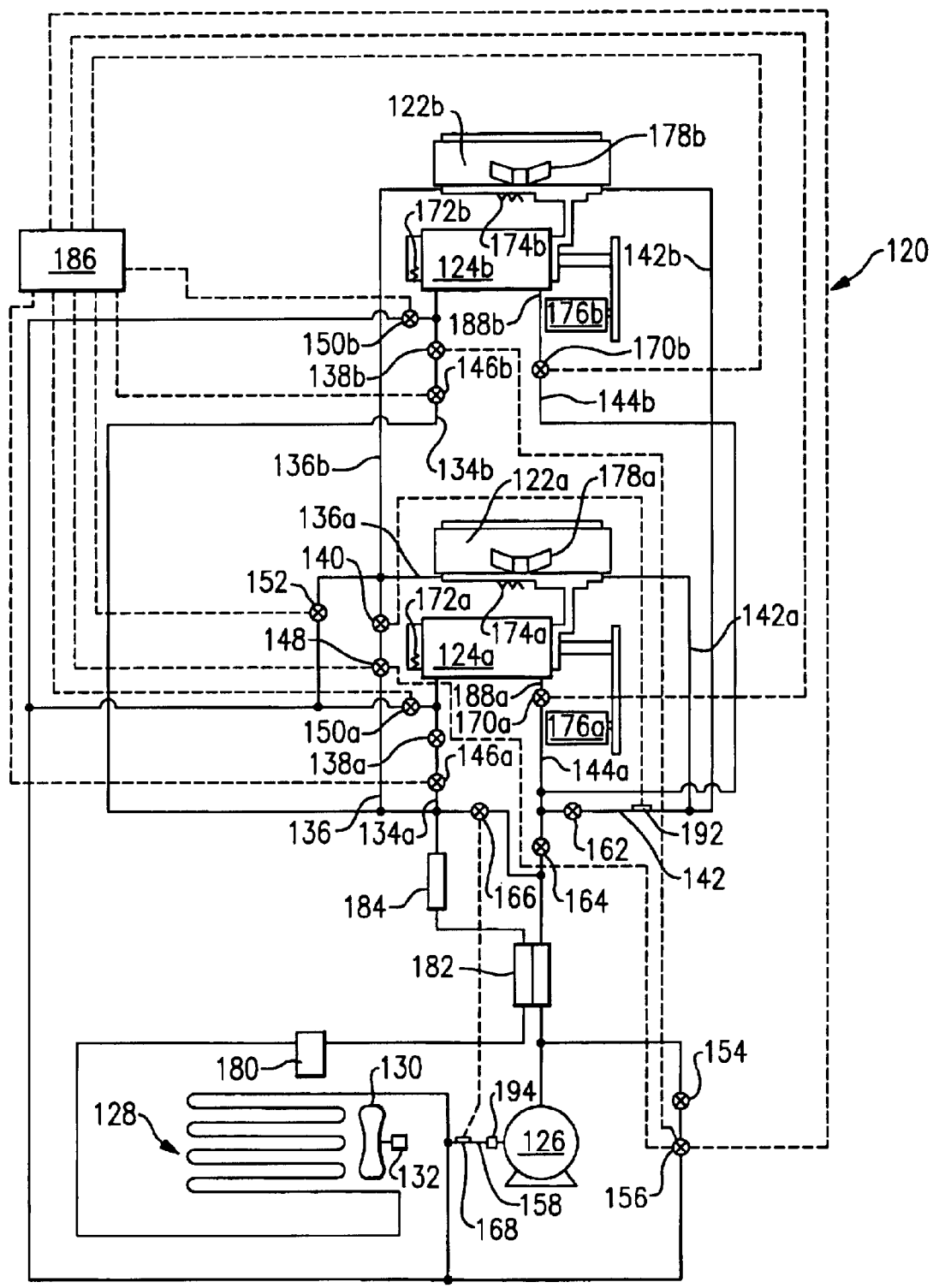
FIG. 2 schematically illustrates a second embodiment of the hot gas heat treatment system of the present invention.

FIG. 2 illustrates a second embodiment of the system 120 of the present invention. A TXV expansion valve 140 and liquid line solenoid valve 148 control the flow of liquid refrigerant into both of the hoppers 122a and 122b. A hot gas solenoid valve 152 controls the flow of hot gaseous refrigerant from the compressor discharge 158 to the hoppers 122a and 122b. An evaporator pressure regulator valve, or an EPR valve 162, is positioned proximate to the discharge of the hoppers 122a and 122b. The refrigerant exits the hoppers 122a and 122b through the paths 142a and 142b, respectively. The paths 142a and 142b merge into a path 142, and the EPR valve 162 is located on the path 142.

The TXV expansion valves 140a and 140b of FIG. 1 are combined into a single TXV expansion valve 140, the liquid line solenoid valves 148a and 148b of FIG. 1 are combined into a single liquid line solenoid valve 148, the hot gas solenoid valves 152a and 152b of FIG. 1 are combined into a single hot gas solenoid valve 152, and the EPR valves 162a and 162b of FIG. 1 are combined into a single EPR valve 162.

The TXV expansion valve 140 is controlled by a temperature sensing bulb 192. The temperature sensing bulb 192 detects the temperature of the refrigerant exiting the hoppers 122a and 122b. The TXV expansion valve 140 controls the temperature of the refrigerant entering the hoppers 122a and 122b by controlling the amount of refrigerant that enters the hoppers 122a and 122b based on the value detected by the temperature sensing bulb 192.

During the cooling mode, the expansion valve 140 and the liquid line solenoid valve 148 are opened and the hot gas solenoid valve 152 is closed. The refrigerant from the compressor 126 is cooled in the condenser 128 and flows along the path 136. The path 136 splits into a path 136a that flows to the first hopper 122a and a path 136b that flows to the second hopper 122b to cool the mix in the hoppers 122a and 122b.

During the heating mode, the expansion valve 140 and the liquid line solenoid valve 148 are closed and the hot gas solenoid valve 152 is open. The refrigerant from the compressor discharge 158 of the compressor 126 flows along a path 136a that flows to the first hopper 122a and a path 136b that flows to the second hopper 122b to heat the mix in the hoppers 122a and 122b.

Figure 3:
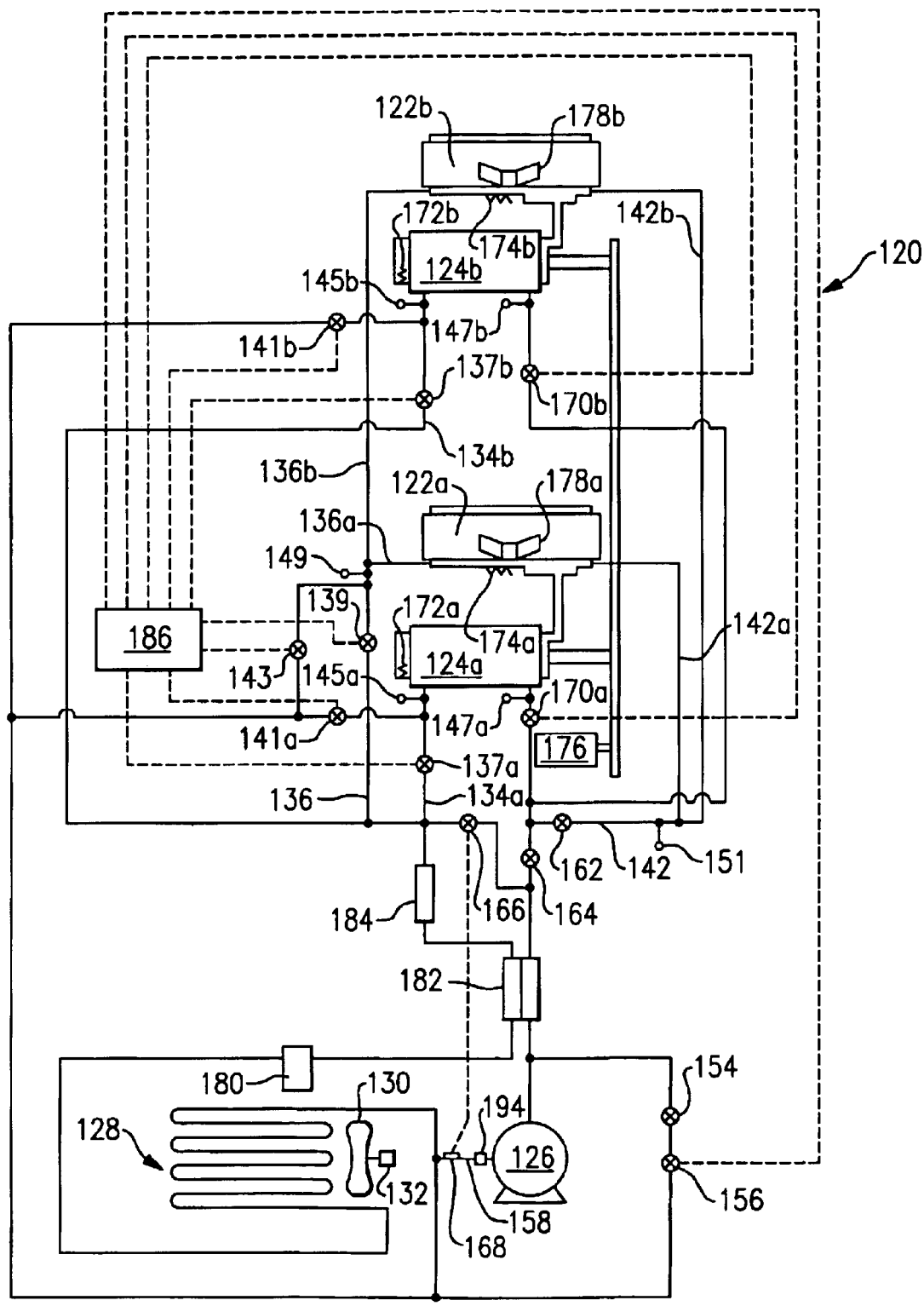
FIG. 3 schematically illustrates a third embodiment of the hot gas heat treatment system of the present invention.

FIG. 3 illustrates a third embodiment of the system 120 of the present invention. The system 120 includes pulse width modulated valves or stepper valves rather than the AXV valves/solenoid valve, TXV valves/solenoid valves of FIGS. 1 and 2 and eliminating the need for solenoid valves. A PWM valve 137a controls the flow of the refrigerant entering the first freezing cylinder 124a, a PWM valve 137b controls the flow of the refrigerant entering the second freezing cylinder, and a PWM valve 139 controls the flow of the refrigerant entering both the hoppers 122a and 122b. A PWM valve 141a controls the flow of hot gas refrigerant from the compressor 126 and entering the first freezing cylinder 124a, a PWM valve 141b controls the flow of hot gas refrigerant from the compressor 126 and entering the second freezing cylinder 124b, and a PWM valve 143 controls the flow of hot gas refrigerant from the compressor 126 and entering both the hoppers 122a and 122b.

The system 120 further includes pressure or temperature transducers 145a and 145b at the inlet of the freezing cylinders 124a and 124b, respectively, pressure or temperatures transducers 147a and 147b at the outlet of the freezing cylinders 124a and 124b, respectively, a pressure or temperature transducer 149 on the line leading to the inlets of the hoppers 122a and 122b and a pressure or temperature transducer 151 on the line leading from the outlets of the hoppers 122a and 122b. Refrigerant flow through the PWM valves 137a, 137b, 139, 141a, 141b and 143 is based on the values detected by the transducers 145a, 145b, 147a, 147b, 149 and 151. That is, refrigerant flow is adjusted as a function of pressure or superheat.

An evaporator pressure regulator valve, or an EPR valve 162, is positioned proximate to the discharge of the hoppers 122a and 122b. The refrigerant exits the hoppers 122a and 122b through the paths 142a and 142b, respectively. The paths 142a and 142b merge into a path 142, and the EPR valve 162 is located on the path 142.

During the cooling mode, the PWM valves 137a, 137b and 139 are modulated and the PWM valves 141a, 141b and 142 are closed. The refrigerant from the compressor 126 is cooled by the condenser 128 cools the mix in the hoppers 122a and 122b and freezing cylinders 124a and 124b.

During the heating mode, the PWM valves 137a, 137b and 139 are closed and the PWM valves 141a, 141b and 142 are modulated. The refrigerant from the compressor 126 heats the mix in the hoppers 122a and 122b and the freezing cylinders 124a and 124b.

Although a first hopper 122a and a first freezing cylinder 124a for a mix and a second hopper 124a and a second freezing cylinder 124b for another mix have been illustrated and described, it is to be understood that the system 120 can include any number of hoppers and freezing cylinders. Each hopper and freezing cylinder pair can be used for a different flavor of frozen dessert.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A refrigeration system comprising:
a compression device to compress a refrigerant to a high pressure, said compression device including a compressor suction and a compressor discharge;
a heat rejecting heat exchanger for cooling said refrigerant;
a first cylinder expansion device for expanding a first portion of said refrigerant to a first cylinder low pressure;
a first cylinder heat exchanger, said first portion of said refrigerant from said first cylinder expansion device exchanging heat with a first mix in said first cylinder heat exchanger;
a second cylinder expansion device for expanding a second portion of said refrigerant to a second cylinder low pressure;
a second cylinder heat exchanger, said second portion of said refrigerant from said second cylinder expansion device exchanging heat with a second mix in said second cylinder heat exchanger;
a hopper expansion device for expanding a third portion of said refrigerant to a hopper low pressure;
a first hopper heat exchanger, a portion of said third portion of said refrigerant from said hopper expansion device exchanging heat with said first mix in said first hopper heat exchanger; and
a second hopper heat exchanger, a remainder of said third portion of said refrigerant from said hopper expansion device exchanging heat with said second mix in said second hopper heat exchanger.

2. The system as recited in claim 1 wherein said hopper expansion device comprises a first hopper expansion device and a second hopper expansion device, and said first hopper expansion device expands said portion of said third portion of said refrigerant entering said first hopper heat exchanger and said second hopper expansion device expands said remainder of said third portion of said refrigerant entering said first hopper heat exchanger.

3. The system as recited in claim 2 further comprising a first hopper liquid line solenoid valve positioned between said first hopper expansion device and said heat rejecting heat exchanger, a first cylinder liquid line solenoid valve positioned between said first cylinder expansion device and said heat rejecting heat exchanger, a second hopper liquid line solenoid valve positioned between said second hopper expansion device and said heat rejecting heat exchanger, and a second cylinder liquid line solenoid valve positioned between said second cylinder expansion device and said heat rejecting heat exchanger.

4. The system as recited in claim 3 further comprising a first hopper hot gas solenoid valve positioned between said compressor discharge and said first hopper heat exchanger, a first cylinder hot gas solenoid valve positioned between said compressor discharge and said first cylinder heat exchanger, a second hopper hot gas solenoid valve positioned between said compressor discharge and said second hopper heat exchanger, and a second cylinder hot gas solenoid valve positioned between said compressor discharge and said second cylinder heat exchanger.

5. The system as recited in claim 4 wherein said first hopper liquid line solenoid valve, said first cylinder liquid line solenoid valve, said second hopper liquid line solenoid valve, and said second cylinder liquid line solenoid valve are open and said first hopper hot gas solenoid valve, said first cylinder hot gas solenoid valve, said second hopper hot gas solenoid valve, and said second cylinder hot gas solenoid valve are closed to allow refrigerant from said heat rejecting heat exchanger to cool said first mix in said first hopper heat exchanger and said first cylinder heat exchanger and to cool said second mix in said second hopper heat exchanger and said second cylinder heat exchanger.

6. The system as recited in claim 4 wherein said first hopper liquid line solenoid valve, said first cylinder liquid line solenoid valve, said second hopper liquid line solenoid valve, and said second cylinder liquid line solenoid valve are closed and said first hopper hot gas solenoid valve, said first cylinder hot gas solenoid valve, said second hopper hot gas solenoid valve, and said second cylinder hot gas solenoid valve are open to allow refrigerant from said compressor discharge of said compressor to heat first mix in said first hopper heat exchanger and said first cylinder heat exchanger and to heat said second mix in said second hopper heat exchanger and said second cylinder heat exchanger.

7. The system as recited in claim 4 further including a hot gas bypass valve positioned between said compressor discharge and said compressor suction, and said hot gas bypass valve is opened to increase refrigerant flow from said compressor discharge to said compressor suction when said first hopper liquid line solenoid valve and second hopper liquid line solenoid valve are opened, and said first cylinder liquid line solenoid valve, said second cylinder liquid line solenoid valve, said first hopper hot gas solenoid valve, second hopper hot gas solenoid valves, said first cylinder hot gas solenoid valve and said second cylinder hot gas solenoid valves are closed.

8. The system as recited in claim 7 further including a hot gas bypass solenoid valve in series with said hot gas bypass valve and activated in parallel with said first hopper liquid line solenoid valve and said second hopper liquid line solenoid valve, and said hot gas bypass solenoid valve is opened when said first hopper liquid line solenoid valve and said second hopper liquid line solenoid valve are opened.

9. The system as recited in claim 4 further including a first suction solenoid valve positioned proximate to a first cylinder discharge of said first cylinder heat exchanger and a second suction solenoid valve positioned proximate to a second cylinder discharge of said second cylinder heat exchanger, and said first suction solenoid valve and said second suction solenoid valve are closed when said system is inactive to prevent said refrigerant from migrating towards said first cylinder heat exchanger and said second cylinder heat exchanger.

10. The system as recited in claim 4 further including a first suction solenoid valve positioned proximate to a first cylinder discharge of said first cylinder heat exchanger and a second suction solenoid valve positioned proximate to a second cylinder discharge of said second cylinder heat exchanger, and said first suction solenoid valve, said second suction solenoid valve, said first hopper hot gas solenoid valve, and said second hopper hot gas solenoid valve are open are open simultaneously, and said first cylinder hot gas solenoid valve and said second cylinder hot gas solenoid valve are opened after said first suction solenoid valve and said second suction solenoid valve are opened.

11. The system as recited in claim 1 further including a first EPR valve positioned proximate to a first hopper discharge of said first hopper heat exchanger and a second ERP valve positioned proximate to a second hopper discharge of said second hopper heat exchanger, and said first EPR valve and said second EPR valve are closed to increase a pressure of said refrigerant in said first hopper heat exchanger and said second hopper heat exchanger and to increase a temperature of said refrigerant in said first hopper heat exchanger and said hopper heat exchanger.

12. The system as recited in claim 1 further including a CPR valve positioned proximate to said compressor suction, and said CPR valve is restricted to reduce a suction pressure of said refrigerant flowing into said compressor suction and to reduce a discharge pressure of said refrigerant exiting said compressor discharge.

13. The system as recited in claim 1 further including a TREV valve positioned between an outlet of said heat rejecting heat exchanger and said compressor suction, and said TREV valve opens to allow said refrigerant from said outlet of said heat rejecting heat exchanger to enter said compressor suction when said TREV sensor senses that a compressor discharge temperature is greater than a threshold value.

14. The system as recited in claim 13 further including a CPR valve positioned proximate to said compressor suction to reduce a discharge pressure of said refrigerant exiting said compressor discharge, and said TREV valve injects said refrigerant at a location between said CPR valve and said compressor suction.

15. The system as recited in claim 1 wherein said first hopper heat exchanger, said first cylinder heat exchanger, said second hopper heat exchanger, and said second cylinder heat exchanger are a heat accepting heat exchanger when the system operates in a cooling mode and said first hopper heat exchanger, said first cylinder heat exchanger, said second hopper heat exchanger, and said second cylinder heat exchanger are a heat rejecting heat exchanger when the system operates in a heating mode.

16. The system as recited in claim 15 wherein said refrigerant in said first hopper heat exchanger, said first cylinder heat exchanger, said second hopper heat exchanger, and said second cylinder heat exchanger cools said first mix and said second mix when the system operates in said cooling mode, and said refrigerant in said first hopper heat exchanger, said first cylinder heat exchanger, said second hopper heat exchanger, and said second cylinder heat exchanger heats said first mix and said second mix when the system operates in said heating mode.

17. The system as recited in claim 1 wherein said first cylinder expansion device and said second cylinder expansion device are an AXV expansion valve.

18. The system as recited in claim 1 wherein said hopper expansion device is a TXV expansion device.

\* \* \* \* \*